United States Patent [19]

Vayra

[11] Patent Number: 4,716,927

[45] Date of Patent: Jan. 5, 1988

[54] INTEGRATED CONTROL SAFETY VALVE MEANS

[75] Inventor: Jean Vayra, Meyreuil, France

[73] Assignee: Commissariat a l'Energie Atomique, Paris, France

[21] Appl. No.: 939,116

[22] Filed: Dec. 8, 1986

[30] Foreign Application Priority Data

Dec. 16, 1985 [FR] France .................. 85 18614

[51] Int. Cl.$^4$ ..................... G05D 16/00; F16K 31/122
[52] U.S. Cl. ..................................... 137/490; 137/495
[58] Field of Search ............... 137/488, 490; 251/63; 137/486, 489, 495

[56] References Cited

U.S. PATENT DOCUMENTS

| | | | |
|---|---|---|---|
| 3,771,553 | 11/1973 | Huet | 137/488 |
| 4,129,141 | 12/1978 | Vogeli | 137/488 X |
| 4,519,416 | 5/1985 | Chaouloff | 137/488 |
| 4,552,173 | 11/1985 | Vaura | 137/490 |
| 4,586,533 | 5/1986 | Estes | 137/488 |
| 4,615,356 | 10/1986 | Reip | 137/488 |

FOREIGN PATENT DOCUMENTS 2538493 6/1984 France .
2315017 10/1974 Netherlands .

Primary Examiner—Alan Cohan
Attorney, Agent, or Firm—Oblon, Fisher, Spivak, McClelland, & Maier

[57] ABSTRACT

Control safety valve means for an enclosure containing a pressurized fluid. With the cylindrical chamber, the piston defines a pressure chamber for closing the main valve, the pressure chamber being linked with the enclosure by a passage. The piston has a face directed towards the closing pressure chamber A of the main valve, and the surface of the piston face directed towards the main valve closing chamber is greater than the surface of the main valve directed towards the enclosure. The main valve is located on the side of the outlet with respect to the seat of the valve means.

10 Claims, 2 Drawing Figures

INTEGRATED CONTROL SAFETY VALVE MEANS

FIELD OF THE INVENTION

The present invention relates to an integrated control safety valve means.

A safety valve means is placed on an enclosure containing a pressurized fluid. It makes it possible to limit the pressure within the enclosure. In the case of a sudden overpressure, the valve means opens, which makes it possible to discharge a fluid quantity and consequently limit the pressure within the enclosure.

Control safety valve means incorporate a main valve by which the fluid is discharged from the container, as well as a control valve. The opening of the main valve is controlled by the control device, which is regulated to the maximum pressure which it is not wished to exceed within the enclosure. As a result of this arrangement, control valves operate on a hit or miss basis and the main valve is either open or closed without any intermediate position. Thus, displacement risks are limited and the life of the valve is increased.

BACKGROUND OF THE INVENTION

A one-piece, integrated control valve means is known (FR-A-82 21663), which reduces risks of damage due to the breaking of an external pipe. It is autoclave, which means that the pressure within the container applies the main valve to its seat.

An integrated control safety valve is also known (DE-A-2315 017), which has a body provided with an intake and an outlet for a fluid. A piston traversed by an axial channel mounted in sliding manner bears on a seat. A control valve is applied to a seat by means of a regulatable helical spring.

The valve means has an auxiliary piston mounted on the main piston and has a very large surface area (three hundred times greater) than that of the piston. The lower face of the piston is connected by a channel to a chamber downstream of the control valve.

The thus defined valve means is autoclave, because the surface of the face of the piston directed towards the closing pressure chamber of the main valve exceeds the surface of the main valve directed towards the enclosure. Thus, in the case of a slow pressure variation within the enclosure, the pressure is imparted to the closing chamber, so that the valve means is autoclave.

However, if the control valve is blocked for any reason, the main valve can no longer open, which would lead to a pressure increase which could lead to the enclosure fracturing.

In the same way, in the case of a sudden increase in the pressure within the enclosure, a certain time lag is necessary due to the small passage cross-section of the channel leading to the opening chamber to enable the pressure in the opening chamber of the main valve to reach an adequate value for bringing about the opening of the main valve. Thus, the enclosure could suffer serious damage before the valve means has been able to fulfil its function—i.e., that of lowering the pressure.

OBJECT OF THE INVENTION

The invention consequently aims at producing an autoclave-type integrated control safety valve means in which the main valve can instantaneously open in the case of a sudden increase in the pressure within the enclosure, even if the control valve is blocked.

SUMMARY OF THE INVENTION

More specifically, the present invention relates to an integrated control safety valve means for an enclosure containing a pressurized fluid, the valve means comprising a valve body provided with an inlet and an outlet for the fluid, the inlet communicating with the pressurized enclosure and the outlet being linked with the atmosphere, a seat located between the inlet and the outlet, the body defining a cylindrical chamber, a piston slidingly mounted in the cylindrical chamber, a main valve fixed beneath the piston and able to close the seat, elastic means for applying the main valve to the seat, a channel axially traversing the valve means, a control valve located in the piston, elastic means for applying the control valve to its seat, the piston defining with the cylindrical chamber a pressure chamber A for closing the main valve, a pressure chamber B for opening the main valve, the chamber A being linked with the enclosure by a channel, the piston having a surface face $S_b$ directed towards pressure chamber B and a surface face $S_a$ directed towards pressure chamber A, surface $S_a$ exceeding surface $S_c$ of face C of the main valve and being less than the sum of the surfaces $S_b$ of the face of the piston and $S_c$ of the face C of the main valve, wherein a valve is located in the channel connecting the closing pressure chamber A of the main valve to the enclosure, the valve having an upper passage orifice and a lower passage orifice, as well as a ball movable within a cavity between the upper and lower orifices, the ball being able to close the upper orifice in the case of an overpressure occurring within the enclosure.

Preferably, the valve means has means for testing the calibration pressure of the main valve, the means for testing being constituted by a tap or cock making it possible to connect chamber A to a pressure source of an external fluid.

Preferably, the valve means has a tap or cock making it possible to connect to the atmosphere the closing pressure chamber of the main valve.

As a result of the above characteristics and in particular due to the presence of the ball valve, in the case of a sudden rise in the pressure within the enclosure, the valve ball engages against the upper orifice of the valve under the effect of the pressure difference prevailing within the enclosure and the closing pressure chamber of the valve means and closes the communicating channel connecting the enclosure to the chamber. The force acting on the face of the main valve directed towards the enclosure thus exceeds the force acting on its surface directed towards the closing chamber. Therefore the main valve can open without delay under the effect of the overpressure. The pressure within the enclosure consequently drops suddenly, so that risks of explosion or damage to the enclosure are eliminated.

Furthermore, due to the presence of a cock making it possible to place the closing pressure chamber of the main valve under atmospheric conditions, it is possible to manually open the main valve in the case of the control valve blocking. Thus, the placing under atmospheric conditions of the channel connecting the interior of the enclosure to the closing pressure chamber leads to the appearance of a pressure difference between the upper orifice and the lower orifice of the ball valve, so that the ball of the valve is instantaneously engaged against the upper orifice, which closes the passages channel. The pressure prevailing within the closing pressure chamber is discharged to the atmosphere by the cock, so that a pressure difference appears between the face of the main valve directed towards the enclosure and the face of the main valve directed towards the closing pressure chamber. In an identical manner to what has been explained hereinbefore, the main valve opens, which makes it possible to bring about a drop in the pressure within the enclosure. Thus, this cock cooperates with the ball valve and makes it possible to isolate the closing pressure chamber from the interior of the enclosure and constitutes a manual opening means for the main valve, which provides great security in the case of the control valve blocking.

BRIEF DESCRIPTION OF THE DRAWINGS

The invention is described in greater detail hereinafter relative to non-limitative embodiments and the attached drawings.

DETAILED DESCRIPTION OF THE PREFERRED EMBODIMENTS

Figure 1:
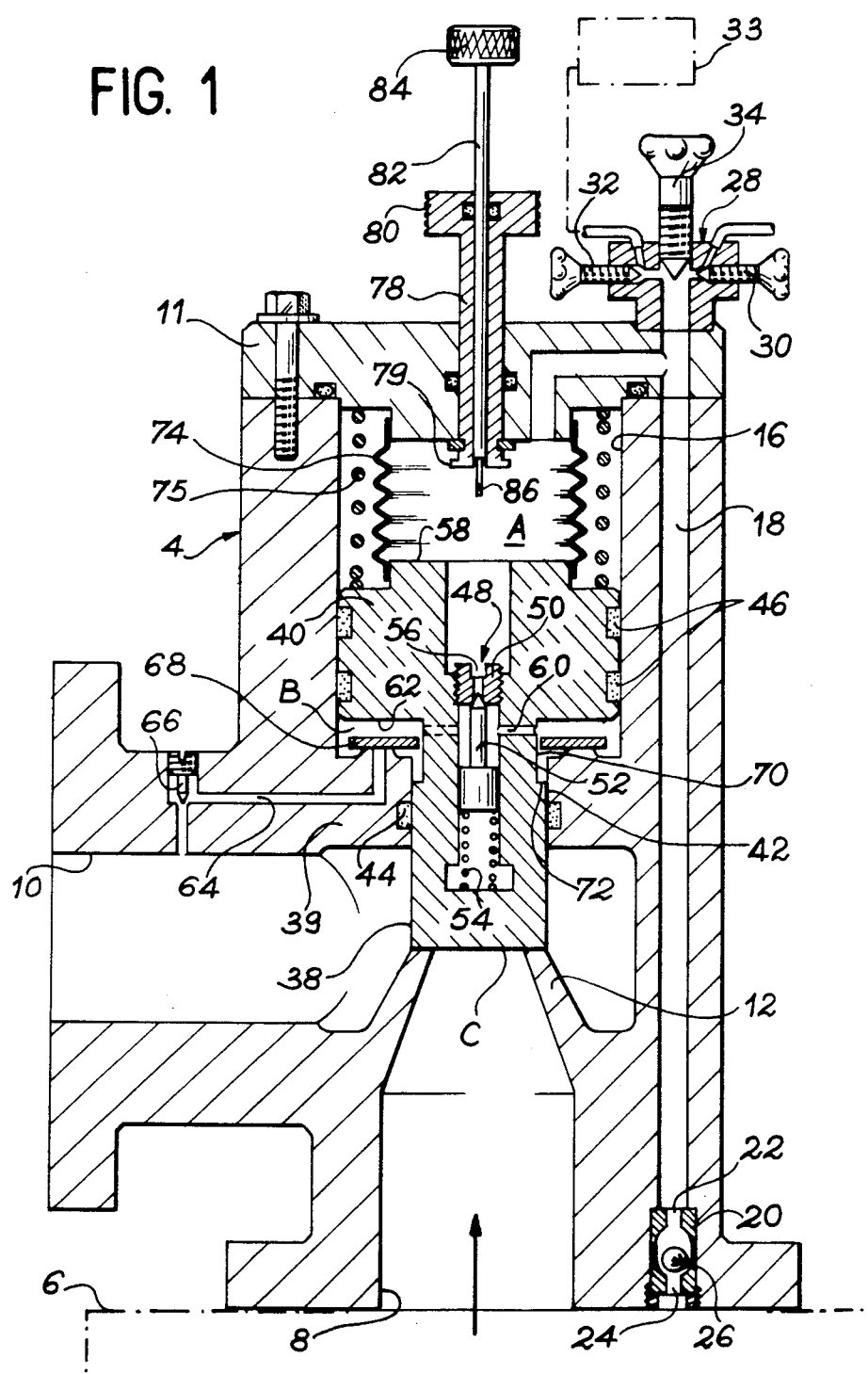
FIG. 1 A first embodiment of a safety valve means according to the invention.

FIG. 1 shows a first embodiment of the invention. The valve means comprises a valve body 4 fixed to a wall 6 of an enclosure, shown in mixed line form and which contains a pressurized fluid. In the lower part of the valve means, the valve body 4 defines an inlet 8 and an outlet 10 for the fluid. The inlet 8 is linked with the interior of the enclosure, whilst the outlet 10 is linked with the atmosphere. For example, it is connected to a blow-off tank. A seat 12 for the main valve is provided between the inlet 8 and the outlet 10. As can be seen, the lips of the seat 12 are directed upwards in the case of FIG. 1, the enclosure being located at the bottom thereof.

In the upper part of the valve means, the valve body 4 also defines a cylindrical chamber 16. A channel 18 connects the enclosure to the closing pressure chamber A defined within the cylindrical chamber 16 by a sealing bellows 74. Moreover, a ball valve 20 is disposed in the channel 18. The ball valve 20 is constituted by a chamber provided at each of its ends with a small cross-section, an upper passage orifice 22, and a lower passage orifice 24. The inlet of each of these orifices defines a seat for a ball 26 able to close each of the orifices 22 or 24.

A three-way cock 28 is connected to the channel 18 and has a first way 30 making it possible to place the channel 18 under atmospheric conditions, a second way 32 making it possible to connect the channel 18 to a pressure source 33 of an external fluid, and a third way 34 making it possible to isolate the channel 18 both from the atmosphere and the pressurized fluid source 33. The operation of the three-way cock 28 will be described hereinafter.

On the one hand, the safety valve of the invention comprises a piston 40 having an upper face 58 and a lower face 62 extended in its lower part by a main valve 38. A bearing spring 75 acts on the piston 40. The main valve 38 is slidingly mounted in a circular bore provided in a wall 39. A gasket 44 ensures sealing between the external diameter of the main valve 38 and a wall 42. The main valve 38 is located on the side of the outlet 10 with respect to the lips of the seat 12. The piston 40 is slidingly mounted in the cylindrical chamber 16. Gaskets 46 ensure the necessary sealing between the cylinder chamber 16 and the piston 40.

A control valve 48 is located within the piston 40. The function of the control valve 48 is to open or close a channel linking the upper face 58 and the lower face 62 of the piston 40. The control valve 48 comprises a seat 50 constituted by an externally threaded ring and traversed by an axial passage channel. The control valve 48 also comprises a pin 52 able to close the axial channel of the seat 50. The pin 52 is engaged with the seat 50 by a spring 54. The calibration of the spring 54 can be regulated by screwing up or unscrewing to a greater or lesser extent the seat 50, so as to compress the spring 54 to a greater of lesser extent. For this purpose a slot 56, shown in profile form in FIG. 1, makes it possible to screw up or unscrew the seat 50.

The piston 40 defines two chambers with the cylindrical chamber 16. In the upper part of the cylindrical chamber 16 is formed the previously mentioned closing pressure chamber A of the main valve 38, and in the lower part of the cylindrical chamber 16 is formed an opening pressure chamber B. The closing pressure chamber A is called the pressure chamber because it is linked with the enclosure by the channel 18, and the pressure prevailing in the channel 18 acts on the upper face 58 of the piston 40 in the sense of closing the main valve 38. Surface $S_a$ of the upper face 58 is greater than surface $S_c$ of face C of the main valve 38, so that the valve means is autoclave. The sealing bellows 74 tightly connects the upper part of the valve body 4 to the upper face of the piston 40. The function of the sealing bellows 74 is to reduce the surface of the upper face 58 of the piston 40 subject to the pressure prevailing within the enclosure by means of the channel 18.

The pressure within the opening pressure chamber B acts on the lower face 62 of surface $S_b$ of the piston 40, in order to move the piston 40 in the opening sense of the main valve 38. The opening chamber B is linked with the closing chamber A by a channel 60, when the pin 52 of the control valve 48 is open. The pin 52 opens when the pressure in the closing chamber A exceeds a predetermined calibration value of the spring 54.

The opening chamber B of the main valve 38 is linked with the atmosphere by means of a purge channel 64 issuing into the outlet 10. The passage cross-section of the purge channel 64 is calibrated by means of a set screw 66. Means are provided for closing the inlet of the purge channel 64. In the embodiment shown in FIG. 1, these means are constituted by a washer 68 slidingly mounted on a reduced diameter part 70 of the main valve 38 defining a shoulder 72. In order that the valve means can function correctly, two conditions must be fulfilled. Firstly, for the valve means to be autoclave, it is necessary for the surface $S_a$ of the upper face 58 of the piston 40 to be greater than the surface $S_c$ of the main valve 38 directed towards the enclosure and consequently subject to the pressure prevailing within the enclosure. Secondly, to enable the displacement of the piston 40 in the case of overpressure, it is necessary that the sum of the surfaces subject to a pressure tending to open the main valve 38 is greater than the surface $S_a$ tending to close the same. In other words, surface $S_b$ of the lower face 62 of the piston 40 plus surface $S_c$ must exceed $S_a$.

Finally, a cover 11 of the valve body 4 is provided with means making it possible to regulate and release at will the control valve during operation. These means are constituted by two concentric rods, an external rod 78 and in inner rod 82 mounted in a sliding and rotary manner in the upper part of the valve body 4, in the axis of the pin 52 and more specifically in the axis of the control valve 48. The external rod 78 is provided at its lower end with lugs 79, which engage in the slot 56 when the external rod 78 is forced downwards. The external rod 78 is provided at its upper end with a knurled knob 80 making it possible to rotate it so as to screw up or unscrew the seat 50 of the control valve 48. This makes it possible to regulate the calibration of the control valve 48 by compressing the spring 54 to a greater or lesser extent.

The inner rod 82 is slidingly mounted in the external rod 78. At one end it is provided with a knurled knob 84, so that it can be displaced in translation so as to engage its lower end 86 in the axial passage channel of the seat 50, so as to bear on the pin 52 and bring about an opening of the control valve 48.

The above described safety valve means functions in the following way. When an overpressure appears in the enclosure, it is transmitted by the channel 18 to the closing pressure chamber A. The pin 52 is calibrated and has a given value, so as to open when a reference pressure is reached. When this pressure is exceeded, the control valve 48 opens and the pressurized fluid enters through the channel 60 into the opening pressure chamber B until the pressure in the opening pressure chamber B is equal to the pressure in the enclosure. At this moment, the purge channel 64 linking the opening pressure chamber B with the atmosphere is closed by the washer 68. As was stated hereinbefore, the surface $S_b$ of the lower face 62 of the piston 40 directed towards the opening pressure chamber B, plus the surface $S_c$ of the main valve 38 directed towards the enclosure exceeds the surface $S_a$ of the upper face 58 of the piston 40 directed towards the closing pressure chamber A. The resultant force exerted on the piston 40 and the main valve 38 consequently rapidly exceeds the force exerted by the bearing spring 75, and the main valve 38 opens. The fluid under over-pressure is then discharged through the outlet 10.

During its opening movement, the main valve 38 drives upwards the washer 68 via the shoulder 72, which frees the inlet opening of the purge channel 64 for placing under atmospheric conditions. However, the passage cross-section of the purge channel 64 is calibrated, as stated hereinbefore, so that the pressure within the opening pressure chamber B does not rapidly decrease, so that the valve means remains open.

When the pressure within the enclosure has returned to a normal value, the control valve 48 closes again. The pressure within the opening pressure chamber B drops as a result of the discharge of fluid through the purge channel 64, which leads to the closing of the main valve 38 under the action of the pressure in the closing pressure chamber A, plus the effect of the bearing spring 75. Slightly before the end of the closing travel of the piston 40, the washer 68 again closes the inlet of the purge channel 54. Thus, a fluid cushion is enclosed within the opening pressure chamber B and damps the closing of the main valve 38.

In the case of a sudden pressure increase within the enclosure (such as, e.g., with water hammer), the operation of the safety valve differs. Under the effect of the sudden pressure increase, the ball 26 of the ball valve 20 is projected upwards and closes the upper passage orifice 22. Consequently the pressure within the closing pressure chamber A can no longer increase and remains at the value which it had prior to the increase of pressure in the enclosure. However, the face of the main valve 38 (surface $S_c$) is directly sensitive to this pressure increase. The force exerted on the main valve 38 consequently exceeds the force exerted by the bearing spring 75 and the pressure exerted on the upper face 58 of the piston 40, and the piston 40 can consequently rise without the control valve 48 having come into action. Thus, an opening of the valve means is achieved with a minimum response time. This feature ensures that the enclosure is protected against the effects of a sudden pressure increase.

During the opening movement of the main valve 38, the fluid present in the closing pressure chamber A is compressed, which brings about the opening of the control valve 48 when the reference pressure is exceeded. The fluid then flows into the opening pressure chamber B. The opening of the purge channel 64 and the closing of the main valve 38 then take place in a manner identical to that described hereinbefore in the case of a normal (i.e., flow) increase of the pressure within the enclosure.

Furthermore, the three-way cock 28 makes it possible to test the operation of the valve means and in particular the calibration pressure of the control valve 48. For this purpose the, channel 18 is connected to a fluid pressure source with a known value and exceeding the pressure prevailing within the enclosure under normal operating conditions. Under the effect of this pressure, the ball 26 is engaged against the lower passage orifice 24, thus closing the channel 18.

Due to the fact that the interior of the enclosure is isolated from the closing pressure chamber A of the main valve 38 by the ball valve 20, the pressure exerted within the closing pressure chamber A is equal to the pressure of the external fluid pressure source 33. This pressure is applied to the control valve 48. Under the effect of this pressure, the control valve 48 may or may not open, depending on whether its calibration pressure is below or above the pressure of the external fluid pressure source 33.

If the control valve 48 does not open, the operation is recommenced using an external fluid pressure source 33 having a high value, until the opening of the control valve 48 is brought about. An increase in the pressure of the external fluid pressure source 33 (e.g., a continuous increase in its pressure) makes it possible to determine the pressure value as from which the control valve 48 opens and consequently makes it possible to check the calibration value of the control valve 48. The opening of the control valve 48 can be detected by any known means—e.g., by installing a pressure gauge on the enclosure. The opening of the control valve 48 controls the opening of the main valve 38 and consequently a pressure drop within the enclosure, which can be detected by means of the pressure gauge. A pressure drop read off the pressure gauge consequently makes it possible to deduce that the control valve 48 has opened.

The air venting of the closing pressure chamber A by means of the first way 30 constitutes a manual means for opening the valve means. Thus, under the effect of the closing pressure the depressurization of chamber A, the ball 26 closes the upper passage orifice 22 of the ball valve 20, and the main valve 38 opens solely under the action of the pressure on its lower face C directed towards the enclosure. In the embodiment shown in FIG. 1, the air venting cock of the closing pressure chamber A forms part of the three-way cock 28. However, according to a variant, the three-way cock 28 could be located at a distance from the valve means and could be connected thereto by a duct. The reclosing of the valve means is then brought about by the injection of fluid from an external fluid pressure source 33 by the second way 32.

If the calibration of the spring 54 is not satisfactory, it can be modified by means of the external rod 78 by screwing up or unscrewing, as a function of the particular case, the seat 50 of the control valve 48. The preceding measuring operation is then recommenced to check that the calibration is correct.

Figure 2:
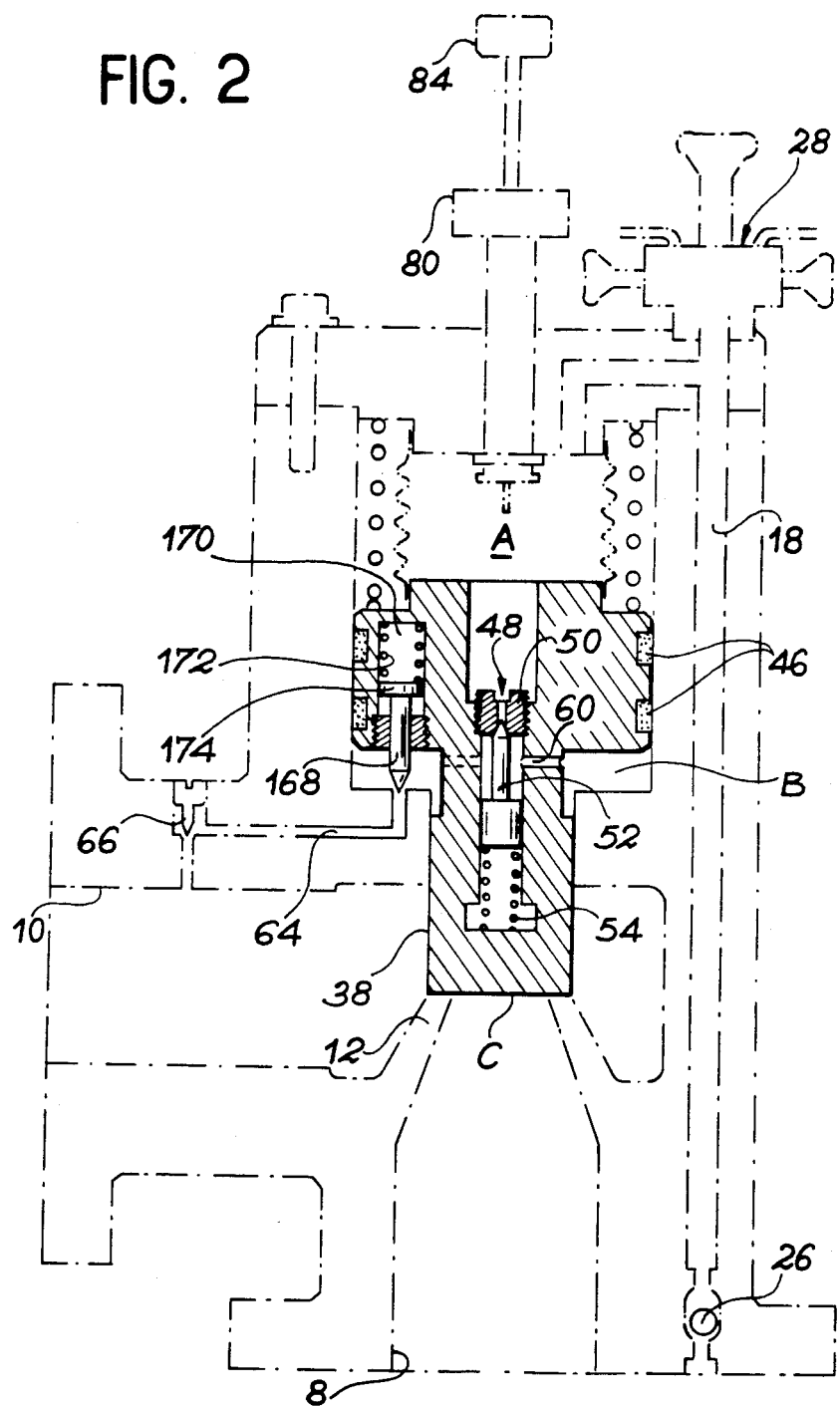
FIG. 2 A constructional variant of the valve means of FIG. 1.

FIG. 2 shows a second embodiment of the invention. Its principle and operation are identical to the first embodiment. The difference between them is based on the means making it possible to close the orifice of the purge channel 64. In the embodiment of FIG. 2, those means are constituted by a closing pin 168 slidingly mounted in a bore 170 made in the piston 40. The inlet of the orifice of the purge channel 64 forms a seat for the closing pin 168, which is maintained elastically against the seat by a helical compression spring 172. At its upper end, the closing pin 168 has a collar 174, which is driven upwards during the opening movement of the main valve 38, which has the effect of the closing pin 169 from its seat. Thus, the closing pin 168 opens with a time lag compared with the main valve 38. However, during the closing movement, the closing pin 168 closes ahead of the main valve 38, which has the effect, as explained with respect to the first embodiment, of enclosing a fluid cushion within the opening pressure chamber B, which damps the closing of the main valve 38.

What is claimed is:

1. An integrated control safety valve means for an enclosure containing a pressurized fluid, the valve means comprising a valve body provided with an inlet and an outlet for the fluid, the inlet communicating with the pressurized enclosure and the outlet being linked with the atmosphere, a seat located between the inlet and the outlet, the body defining a cylindrical chamber, a piston slidingly mounted in the cylindrical chamber, a main valve having a face C directed towards said enclosure, said face C having a surface $S_c$, said main valve being fixed beneath the piston and able to close said seat, elastic means for applying the main valve to the seat, a channel axially traversing the valve means, a control valve located in said piston, elastic means for applying the control valve to its seat, the piston defining with the cylindrical chamber a pressure chamber A for closing the main valve, a pressure chamber B for opening the main valve, said chamber A being linked with the enclosure by a channel, the piston having a surface face $S_b$ directed towards pressure chamber B and a surface face $S_a$ directed towards pressure chamber A, surface $S_a$ exceeding suface $S_c$ of face C of the main valve and being less than the sum of the surfaces $S_b$ of the face of the piston and $S_c$ of the face C of the main valve, wherein a valve is located in the channel connecting the closing pressure chamber A of the main valve to the enclosure, said valve having an upper passage orifice and a lower passage orifice, as well as a ball movable within a cavity between said upper and lower orifices, said ball being able to close the upper orifice in the case of a sudden overpressure occurring within the enclosure.

2. A valve means according to claim 1, wherein it incorporates means for testing the calibration pressure of the main valve, said means being constituted by a cock making it possible to connect chamber A to a pressure source of an external fluid.

3. A valve means according to claim 1, wherein it incorporates a cock making it possible to place the closing pressure chamber A of the main valve under atmospheric conditions.

4. A valve means according to claim 1, wherein it incorporates a cock in the channel linking the pressure chamber A with the enclosure, making it possible to isolate the pressure chamber A from the enclosure.

5. A valve means according to claim 4, wherein the cock making it possible to place the closing pressure chamber A of the main valve under atmospheric conditions, the cock making it possible to connect said chamber to an external fluid pressure source and the cock in the channel linking the pressure chamber A with the enclosure, making it possible to isolate the pressure chamber A from the enclosure are combined within a three-way cock, one of these ways making it possible to place the closing pressure chamber A of the main valve under atmospheric conditions, the second way connecting the chamber A to a pressure source of an external fluid, and the third way making it possible to isolate the channel connecting the closing chamber of the main valve to the enclosure.

6. A valve means according to claim 1, wherein it incorporates means making it possible to regulate the calibration or release of the control valve during the operation of the safety valve means, said means being constituted by two concentric rods located in the axis of the control valve and mounted in a sliding and rotary manner on the valve body, one of these rods having lugs able to engage in a groove of the control valve seat, the other rod having a diameter smaller than the internal diameter of the central duct of the control valve seat.

7. A valve means according to claim 1, wherein the external diameter of the closing chamber A of the main valve is defined by a bellows connected to the valve body at one end and to the piston at its other end, said bellows forming with the inner wall of the cylinder body an annular space housing a bearing spring applying the main valve to the seat.

8. A valve means according to claim 1, wherein the opening pressure chamber B of the main valve is linked with the atmosphere by a calibrated purge channel, means being provided for closing said calibrated purge channel when the main valve is in the closed position, said means opening after the main valve means and closing before it.

9. A valve means according to claim 8, wherein the valve has a smaller diameter part defining a shoulder and a washer slidingly mounted on said smaller diameter part, said washer closing the calibrated channel when the valve means is in the closed position and freeing said calibrated purge channel when the shoulder comes into contact with the washer during an opening movement of the valve means.

10. A valve means according to claim 8, wherein the means for closing the channel linking the opening pressure chamber B of the main valve with the atmosphere are constituted by a closing pin slidingly mounted in a bore of the piston, the inlet of the channel forming a seat for said closing pin, the latter being maintained in elastically bearing manner against said seat, the pin also having a collar moved by the valve means in its opening movement, so as to raise the closing pin from its seat when the valve means opens.

* * * * *